United States Patent Office 3,269,971
Patented August 30, 1966

3,269,971
POLYCARBONATE FLOW EXTENDERS
Kenneth B. Goldblum, Pittsfield, Mass., assignor to General Electric Company, a corporation of New York
No Drawing. Filed Apr. 8, 1965, Ser. No. 446,732
10 Claims. (Cl. 260—31.4)

This invention relates to plasticizers for polycarbonates. More particularly, this invention relates to pasticizers for polycarbonates which do not cause degradation of polymer properties. Specifically, this invention relates to polymeric compositions comprising polycarbonates and a carbonate ester plasticizer having two ester linkages.

Polycarbonates are well known, commercially available materials having a variety of applications in the plastics art. Such carbonate polymers may be prepared by reacting a dihydrice phenol, such as 2,2-bis-(4-hydroxyphenyl)-propane (Bisphenol A), with a carbonate precursor such as phosgene, in the presence of an acid acceptor. Generally speaking, aromatic polycarbonate resins offer a high resistance to the attack of mineral acids, may be molded, and are physiologically harmless as well as stain resistant. In addition, such polymers have high impact strength, a high heat resistance, and a dimensional stability far surpassing that of any other commercially available thermoplastic material. The properties of the polycarbonates render them amenable to a wide variety of commercial applications. However, heretofore, various difficulties have been encountered with the moldability of the polycarbonate resins which, to some extent, have curtailed their range of utility.

Various attempts have been made to render the polycarbonates more moldable. One such attempt was to produce polycarbonates having lower melt viscosities. This did improve moldability of the polycarbonates, but at the expense of other physical properties, especially impact strength. To obtain a polycarbonate resin suitable for molding, it is necessary to severely reduce the intrinsic viscosity—almost to a point where the material will no longer be commercially useful. A second approach recently taken to improve the moldability of the polycarbonates comprises the use of various plasticizers or lubricants. Plasticizers such as adipates, benzoates, chlorinated hydrocarbons, epoxy compounds, glycerol derivatives, glycolates, phosphates, phosphites, phosphenates, phthalates, etc., have been suggested. It has been found that while these plasticizers do render the polycarbonates more readily moldable, they cause degradation of many of the polymer's physical properties. Thus, it has been found that these plasticizers improved the flow of the resin, but caused decreases in intrinsic viscosity with resultant decreases in physical properties.

I have now unexpectedly found that I can improve the moldability of the polycarbonate resins without degrading other properties of the resin by including a carbonate ester having two ester linkages in the polymer composition.

Accordingly, one object of this invention is to provide a polycarbonate resin which is readily moldable and which retains its physical properties.

Another object of this invention is to provide a plasticizer for a polycarbonate which does not degrade the physical properties of the resin.

A third object of this invention is to provide a readily moldable polycarbonate composition comprising a polycarbonate resin and a carbonate ester having two ester linkages.

Other objects and advantages of this invention will be in part apparent and in part pointed out in the description which follows.

Briefly stated, the objects of this invention are accomplished by the addition of a small amount of a carbonate ester to a polycarbonate.

The carbonate esters which may be employed are represented by the following general formula:

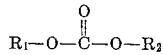

wherein $R_1$ and $R_2$ represent members selected from the group consisting of monovalent substituted and unsubstituted bulky aliphatic, alicyclic, aromatic and heterocyclic groups having at least 6 carbon atoms. The particular group that R may represent is not critical provided that it is a bulky hydrocarbon having greater than 7 carbon atoms. Typical examples of the carbonate esters that may be used as plasticizers with the polycarbonates include, for example, dioctylcarbonate,
didecylcarbonate,
didodecylcarbonate,
dipentadecylcarbonate,
dioctadecylcarbonate,
didocosylcarbonate,
dipentacosylcarbonate,
nonlydecylcarbonate,
heptylundecylcarbonate,
di-2-methylheptylcarbonate,
di-2-ethylheptylcarbonate,
di-3-dimethyldecylcarbonate,
di-4-tert-butyloctadecylcarbonate,
di-2-ethyl-2-decenylcarbonate,
di-2-tert-butyl-1,3-nonadienylcarbonate,
di-2-tert-butyl-3-tetradecynylcarbonate,
dicetylcarbonate,
ditridecylcarbonate,
dilaurylcarbonate,
di-1-propyl-5-methyl-3-heptadecynylcarbonate,
ditolylcarbonate,
dixylylcarbonate,
phenylxylylocarbonate,
distearylcarbonate,
bis(4,4'-tert-butyl)carbonate,
bis(3-ethyl-4-butylphenyl)carbonate,
bis(4-propenylphenyl)carbonate,
4-tert-butylphenylcarbonate,
di-naphthylcarbonate,
bis(5,6-dimethylnaphthyl)carbonate,
bis(5-ethenylnaphthyl)carbonate,
phenylnaphthylcarbonate,
dicyclohexylcarbonate,
dicycloheptylcarbonate, etc.

The expression "polycarbonate resin" as used herein is meant to embrace within its scope polymers of dihydric phenols, as well as carbonate copolymers of such dihydric phenols with glycols, such as ethylene glycol or propylene glycol, for example, diabasic acids, such as for example, isophthalic or terephthalic acid; and hydroxyl or acid-terminated polyesters, such as, for example, the hydroxyl or acid-terminated polyester of neopentyl glycol and adipic acid. Such polycarbonate resins may be prepared by reacting a dihydric phenol with a carbonate precursor such as phosgene, a haloformate or a carbonate ester. Generally speaking, the resulting carbonate polymers may be typified as possessing recurring structural units of the formula:

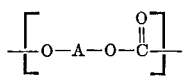

wherein A is a divalent aromatic radical of the dihydric phenol employed in the polymer producing reaction. Preferably, the polycarbonate resins have intrinsic viscosities (as measured in p-dioxane in deciliters per gram at 30° C.) ranging from about 0.35 to 0.75. The dihydric phenols which may be employed to provide such aromatic carbonate polymers are mononuclear or polynuclear aromatic compounds containing as functional groups, two hydroxyl radicals, each of which is attached directly to a carbon atom of an aromatic nucleus. Typical dihydric phenols are 2,2-bis-(4-hydroxyphenyl)-propane;
hydroquinone;
resorcinol;
2,2-bis-(4-hydroxyphenyl)-pentane;
2,4-dihydroxydiphenyl methane;
bis-(2-hydroxyphenyl)-methane;
bis-(4-hydroxyphenyl)-methane;
bis-(4-hydroxy-5-nitrophenyl)-methane;
1,1'-bis-(4-hydroxyphenyl)-ethane;
3,3'-bis-(4-hydroxyphenyl)-pentane;
2,2-dihydroxydiphenyl;
2,6-dihydroxynaphthalene;
bis-(4-hydroxyphenyl)-sulfone;
2,4-dihydroxydiphenyl sulfone;
4,4-dihydroxydiphenyl ether; and
4,4'-dihydroxy-2,5-diethoxydiphenyl ether.

A variety of additional dihydric phenols which may be employed to provide such carbonate polymers are disclosed in U.S. Patent Number 2,999,835, of Eugene P. Goldberg, assigned to the assignee of the present invention. It is, of course, possible to employ two or more different dihydric phenols or, as stated above, a dihydric phenol in combination with a glycol, a hydroxy or acid-terminated polyester, or a diabasic acid in the event a carbonate copolymer rather than a homopolymer is desired.

When a carbonate ester is used as the carbonate precursor in the polymer forming reaction, the materials are reacted at temperatures of from 100° C. or higher for times varying from 1 to 15 hours. Under such conditions, ester interchange occurs between the carbonate ester and the dihydric phenol used. The ester interchange is advantageously consummated at reduced pressures of the order of from about 0.10 to 100 mm. of mercury, preferably in an inert atmosphere, such as nitrogen or argon for example.

Although the polymer forming reaction may be conducted in the absence of a catalyst, one may, if desired, employ the usual ester exchange catalysts, such as, for example, metallic lithium, potassium, calcium and magnesium. Additional catalysts and variations in the exchange methods are discussed in Groggins, "Unit Processes in Organic Syntheses" (fourth edition, McGraw-Hill Book Company, 1952), pages 616 to 620. The amount of such catalyst, if used, is usually small, ranging from about 0.001 to about 0.1 percent, based on the moles of the dihydric phenol employed. The carbonate ester useful in this connection may be aliphatic or aromatic in nature, although aromatic esters, such as diphenylcarbonate, are preferred. Additional examples of carbonate esters which may be used are dimethyl carbonate, diethyl carbonate, phenylmethyl carbonate, phenyltolyl carbonate and di-(tolyl)carbonate.

A preferred method for preparing the carbonate polymers involves the use of a carbonyl halide, such as phosgene, as a carbonate precursor. The method involves passing phosgene gas into a reaction mixture containing the dihydric phenol in an acid acceptor such as a tertiary amine, e.g., pyridine, dimethylaniline, quinoline, etc. The acceptor may be used undiluted or diluted with inert organic solvents, as for example, methylene chloride, chlorobenzene, 1,2-dichloro ethane. Tertiary amines are advantageous since they are good solvents as well as acid acceptors during the reaction period.

The temperature at which the carbonyl halide reaction proceeds may vary from below 0° C. to above 100° C. Te reaction proceeds satisfactorily at temperature from room temperature (25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer in 2 moles of HCl. Two moles of HCl are in turn "attached" by the acid acceptor present. The foregoing are herein referred to as stoichiometric or theoretical amounts.

Another method of preparing the carbonate polymers comprises adding phosgene to alkaline aqueous suspension of the dihydric phenol used. This is preferably done in the presence of inert solvents such as methylene chloride, 1,2-dichloroethane and the like. Quaternary ammonium compounds may be employed to catalyze the action.

A fourth method for preparing such carbonate polymers involves the phosgenation of an agitated suspension of the anhydrous alkali salt of the dihydric phenol used in a non-aqueous medium such as benzene, chlorobenzene, and toluene. The reaction is illustrated by the addition of phosgene to a slurry of the sodium salt of 2,2-bis-(4-hydroxyphenyl)-propane in an inert polymer solvent such as chlorobenzene. The organic solvent should preferably be a polymer solvent but need not necessarily be a good solvent for the reactants.

Generally speaking, a haloformate, such as the bishaloformate of 2,2-bis-(4-hydroxyphenyl)-propane may be substituted for phosgene as the carbonate precursor in any of the methods described above.

In each of the above solution methods of preparation, the carbonate polymer emerges from the reaction in either a true or pseudo solution whereas aqueous base or pyridine is used as an acid acceptor. The polymer may be precipitated from the solution by adding a polymer nonsolvent, such as heptane or isopropanol. Alternatively, the polymer solution may be heated to evaporate the solvent.

The quantity of plasticizer used in the present invention may vary between rather broad limits depending upon the properties desired, but generally speaking, the amount should not be less than 0.1 percent by weight and not more than 5 percent by weight. With quantities less than 0.2 percent, the improvement in moldability is not readily detectable and where the amount exceeds 5 percent, the polycarbonate begins to lose the beneficial properties of the unplasticized polycarbonate. Preferably, the plasticizer is added in amount ranging from about 1.0 percent to about 2 percent of the total weight of the polycarbonate mixture.

Addition of the plasticizer may be accomplished in any manner so long as a thorough distribution of the modifier in the polycarbonate resin is obtained. For example, the mixing of the materials may be accomplished by any one of the variety of methods normally employed for incorporation of fillers, common modifiers, etc. Such methods include, but are not limited to, mixing rolls, dough mixers, Banbury mixers, extruders, and other mixing equipment. The resulting mixture may be handled in any conventional manner employed for the fabrication or manipulation of thermoplastic resins. The mixtures may be formed or molded using compression, injection, calendering, and extrusion techniques.

Alternatively, the plasticizer may be added to the polycarbonate by dissolving both in a common solvent. The solvent is then evaporated to leave the plasticizer homogeneously dispersed throughout the polycarbonate.

The aromatic polycarbonates containing the carbonate esters show substantially no decrease in intrinsic viscosity due to the addition of the plasticizer. In contrast, other well-known polymeric plasticizers such as dioctylphthalate, zinc stearate, stearamide, etc., cause substantial degradation of the polycarbonate and result in reductions of intrinsic viscosity by as much as 30 percent.

The following examples are illustrative of the various aspects of the present invention, but are not to be construed as limiting in any way. All percentages used in the examples are by weight.

EXAMPLE 1

This example is designed to show the effect of carbonate esters having two ester linkages, on the flow properties of polycarbonates.

In this example, various carbonates were mixed with a polycarbonate derived from 2,2-bis(4-hydroxyphenyl)-propane having an intrinsic viscosity of 0.54 dl./g. as measured in p-dioxane at 30° C. In each case, 1188 grams of dry polycarbonate powder were mixed with 12 grams of a carbonate ester. The mixture was blended thoroughly for ½ hour and extruded in a welding engineer's laboratory model twin screw extruder. The extruded strand was chopped into pellets. These pellets were then dried overnight.

To determine the effectiveness of the carbonate esters, a test was devised to measure flowability. The test comprised molding the pellets at a temperature of 580° F. at three different pressures. The pressures employed were 700, 850 and 1000 p.s.i., respectively. The mold employed was of a spiral configuration. The length of a molded spiral strand at a given pressure is a measure of the flowability of the composition, the longer lengths indicating better flow properties.

The following results were obtained:

*Table I.—Flowability of polycarbonate containing carbonate ester additive*

| Carbonate additive | Wt. percent of carbonate | Runner length (inches) at 580° F. | | |
|---|---|---|---|---|
| | | 700 p.s.i. | 850 p.s.i. | 1,000 p.s.i. |
| Dicetyl carbonate | 1 | 13.8 | 15.2 | 16.6 |
| Distearyl carbonate | 1 | 14.0 | 15.4 | 16.9 |
| Dinonylphenyl carbonate | 1 | 13.6 | 15.0 | 16.5 |
| Didodecylphenyl carbonate | 1 | 14.1 | 15.4 | 16.8 |
| Dilauryl carbonate | 1 | 14.8 | 16.3 | 17.5 |
| Ditridecyl carbonate | 1 | 14.5 | 16.0 | 17.1 |
| Control | 0 | 13.5 | 14.7 | 15.3 |

As is apparent from the above table, the incorporation of carbonate esters in low concentrations results in improved flowability.

EXAMPLE 2

In this example, the process of Example 1 was repeated, but the concentration of carbonate ester was increased to 2 percent. The following results were obtained:

*Table II.—Flowability of polycarbonate containing carbonate ester additive*

| Carbonate additive | Wt. percent of carbonate | Runner length (inches) at 580° F. | | |
|---|---|---|---|---|
| | | 700 p.s.i. | 850 p.s.i. | 1,000 p.s.i. |
| Di-neodecyl carbonate | 2 | 16.3 | 17.9 | 19.2 |
| Di-neododecyl carbonate | 2 | 16.6 | 17.8 | 19.0 |
| Control | 0 | 13.5 | 14.7 | 16.0 |

As can be seen from the above table, even greater improvements in flow properties are realized at the 2 percent carbonate additive level.

EXAMPLE 3

Intrinsic viscosities of the samples of Example 1 were determined using the Ostwald viscosimeter. The polycarbonate composition was dissolved in p-dioxane and the viscosity was measured at 30° C. The following results were obtained:

*Table III.—Intrinsic viscosity of polycarbonate containing carbonate ester*

Carbonate ester additive:

|  | Intrinsic viscosity, dl./g. |
|---|---|
| Dicetylcarbonate | 0.53 |
| Distearylcarbonate | 0.53 |
| Dinonylphenyl carbonate | 0.53 |
| Didodecylphenyl carbonate | 0.53 |
| Di-neodecyl carbonate | 0.56 |
| Di-neododecyl carbonate | 0.55 |
| Dilauryl carbonate | 0.53 |
| Ditridecyl carbonate | 0.53 |
| Control | 0.54 |

The effect of the carbonate esters on the intrinsic viscosity of the polycarbonate was substantially nil indicating that the polycarbonate was not degraded due to the addition of the carbonate ester.

Another unique advantage of the present invention is that it provides for polycarbonates having improved flow properties with plasticizer additions of only 0.2 percent. Heretofore, the plasticizers employed with the polycarbonates comprised 10 to 50 percent of the composition. This high percentage of plasticizer led to dilution of the polymer and degradation of the plastic properties. By employing the plasticizers of this invention, the same improvements in flow properties can be obtained utilizing minimal quantities of plasticizer.

It would, of course, be apparent that other changes and modifications can be made in other particular embodiments of the invention described which are within the full intent and scope of the invention as defined by the appended claims.

What I claim as new and desire to secure by Letters Patent of the United States is:

1. A plasticized polycarbonate resin composition consisting of a polycarbonate resin selected from the group consisting of polymers of dihydric phenols and copolymers thereof and a carbonate ester plasticizer having the following general formula:

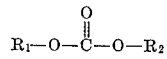

wherein $R_1$ and $R_2$ are monovalent hydrocarbon radicals having 7–25 carbon atoms.

2. The plasticized composition of claim 1 wherein the carbonate ester comprises from 0.2 to 5 percent, by weight, of the polymeric composition.

3. The polycarbonate composition of claim 1 wherein the carbonate ester comprises from 1.0 to 2.0 percent, by weight, of the polymeric composition.

4. The polycarbonate composition of claim 1 wherein the plasticizer is dicetyl carbonate.

5. The polycarbonate composition of claim 1 wherein the plasticizer is distearyl carbonate.

6. The polycarbonate composition of claim 1 wherein the plasticizer is dinonylphenylcarbonate.

7. The polycarbonate composition of claim 1 wherein the plasticizer is dilauryl carbonate.

8. The polycarbonate composition of claim 1 wherein the plasticizer is didodecylphenylcarbonate.

9. The plasticizer polycarbonate composition of claim 1 wherein the plasticizer is dineodecyl carbonate.

10. The plasticized polycarbonate composition of claim 7 wherein the plasticizer is dineododecyl carbonate.

References Cited by the Examiner

UNITED STATES PATENTS 3,071,556  1/1963  Bolgiano _____ 260—31.4

FOREIGN PATENTS 226,853    2/1960  Australia.
1,011,173  4/1952  France.

OTHER REFERENCES

Behavior of Plasticizers, Mellan, Pergamon Press, 1961, pp. 20 and 21.

Chemistry and Physics of Polycarbonates, Schnell, 1964, Interscience Publishers, New York, p. 101.

Polycarbonates, Christopher et al., Reinhold Publishing Co., New York, 1962, pp. 13, 14, and 32.

MORRIS LIEBMAN, *Primary Examiner.*

A. L. LIEBERMAN, *Assistant Examiner.*